United States Patent [19]

Landsrath

[11] 4,235,272
[45] Nov. 25, 1980

[54] SNOW ANTI-SKID DEVICE FOR A MOTOR VEHICLE WHEEL

[76] Inventor: Walter Landsrath, Riottestrasse 7, 6600 Saarbrücken, Fed. Rep. of Germany

[21] Appl. No.: 12,479

[22] Filed: Feb. 15, 1979

[30] Foreign Application Priority Data

Feb. 15, 1978 [DE] Fed. Rep. of Germany ....... 2806419
Jul. 19, 1978 [DE] Fed. Rep. of Germany ....... 2831809

[51] Int. Cl.³ ............................................. B60C 27/00
[52] U.S. Cl. .................................. 152/213 R; 152/218; 152/221; 152/225 C; 152/226
[58] Field of Search ............... 152/213 R, 213 A, 216, 152/218, 214, 217, 221, 226, 225 R, 225 C

[56] References Cited

U.S. PATENT DOCUMENTS

| | | | |
|---|---|---|---|
| 1,577,684 | 3/1926 | Bond | 152/221 |
| 2,185,017 | 12/1939 | Purvis | 152/221 X |
| 2,330,839 | 10/1943 | O'Brien | 152/221 X |
| 2,630,155 | 3/1953 | Kandel | 152/236 |
| 2,871,903 | 2/1959 | Minutilla | 152/225 C X |
| 3,042,095 | 7/1962 | Knowles | 152/213 R UX |
| 3,165,137 | 1/1965 | Burgen | 152/236 |
| 3,897,288 | 7/1975 | Fayling | 52/DIG. 4 |
| 4,098,313 | 7/1978 | Ingerson | 152/213 R |

FOREIGN PATENT DOCUMENTS 265886 10/1968 Austria .
2553342 6/1977 Fed. Rep. of Germany .
2288006 5/1976 France .

*Primary Examiner*—William A. Powell
*Assistant Examiner*—Thomas Bokan
*Attorney, Agent, or Firm*—Cushman, Darby & Cushman

[57] ABSTRACT

A snow anti-skid device a plurality of which are to be fitted at intervals around a motor vehicle wheel. Each device is in the form of a horseshoe-shaped strip-form yoke or stirrup comprised of a thickened central yoke section with curved limbs (20) for embracing the tire (15) extending away from opposite sides thereof. The free ends of the limbs are in the form of claws provided with magnets which engage under and adhere to the shoulders of the wheel rim. The thickened central region of the yoke may be provided with a coating of a resilient material, which can be molded on so as to extend through openings in the strip and provide a non-slip surface abutting the tread of the tire and a studded surface for engaging the ground. One or both limbs of the yoke or stirrup may be resiliently longitudinally extensible, or may be adapted for positive adjustment of its length.

15 Claims, 5 Drawing Figures

SNOW ANTI-SKID DEVICE FOR A MOTOR VEHICLE WHEEL

BACKGROUND AND SUMMARY OF THE PRESENT INVENTION

This invention relates to anti-skid devices, useful for example in snow or mud conditions, and in particular a type of device which can be mounted directly on a motor vehicle's wheel having a rim and tire. The anti-skid device is designed as a yoke or stirrup which embraces the tire and claws are provided at the yoke ends in order to engage with the shoulder of the rim.

Devices of this kind are intended to serve as an alternative to snow chains and are especially useful in instances where a vehicle is stuck in a rut, such as in snow, and cannot move. In such a case, tire chains could at best, be installed only under considerable difficulties whereas the present invention in the form of individual yokes or stirrups can be fitted comparatively simply at accessible positions around the tire. If, after fitting one or two such anti-skid yokes or stirrups, the relevant wheel still slips or fails to grip, the wheel can be stopped at new positions so that further anti-skid yokes or stirrups can be fitted to the tire.

In one known device in which a U-shaped yoke or stirrup engages the associated rim shoulders by claws, the yoke or stirrup consists of a non-bendable iron metal. One yoke or stirrup limb is hinged so that it can be swung out and is lockable by means of a leaf spring in its closure position. The angular position of the yoke limbs is adjustable relative to the central part of the yoke by means of screws. The fastening principle involved in this yoke makes use of the fact that the central part of the yoke is forced away from the rim periphery by tire pressure and in this way the claws are drawn under the rim shoulders.

Therefore the yoke must, when it is fitted, be pressed as firmly as possible by its central part onto the pneumatic tire, so that after swinging in of the yoke limbs, engagement of the claws under the rim shoulders, and release of the pressing force, it is firmly retained by this tire pressure. Naturally this mounting procedure requires considerable and strenuous effort.

Moreover when the yoke is in the lowermost position at the bottom of the wheel, the wheel load acts in opposition to the tire pressure. Accordingly, because of the rigid design of the yoke, the claws can become disengaged from the rim shoulder, and the yoke can, under propulsive force applied through it, tilt in the circumferential direction of the wheel. This represents a considerable danger of damage to the tire, it being possible for the central part of the yoke to be forced by its side edge into the thread of the tire. Moreover, the tire is confined by the rigid yoke, so that it cannot deform in the manner intended from its design.

In contrast the preferred embodiment of this present invention provides a simple and rapidly-mountable anti-skid device which seats securely on the tire even under load conditions.

In accordance with the invention, this is achieved by providing, in the case of an anti-skid device of the kind referred to in the introduction to this specification, for the claws at the yoke or stirrup ends to be equipped with adhesive magnets.

The magnets attached to the claws assures that the claws will not become disengaged from the rim's shoulder even when the yoke limbs transmit wheel loads to the claws which endeavor to lift the claws off from, or draw them away from the shoulder surface on which they are seated.

In appropriate circumstances, the yoke limbs, as well as the yoke web, may be rigid in design in which case one and/or both yoke limbs may be hinged to the yoke web. However, in the present invention it is preferred to make the yoke limbs pressure-yielding, so that forces acting on the yoke web cannot be transmitted to the claws and counteract the positioning thereof as held by the magnets.

By employing resilient yoke limbs the risk of damage to the tire can be avoided since compressive forces will not be transmitted in the longitudinal direction of the yoke limbs from the yoke web to the claws. Thus, the yoke may be made, at least in the region of its limbs, from an elastically pliable strip material, preferably preshaped to correspond with the outer cross-sectional contour of the tire. By fabricating the yoke limbs from an elastically pliable material it allows the yoke to adapt to deformations of the pneumatic tire, so that the tire is not pinched or squeezed, although the yoke is seated securely on the tire under all loads, by the magnets on the claws. In this respect, the magnets in or on the claws ensure that the claws remain in position on the shoulder surface of the rim and do not slip off from or become disengaged from the shoulder even when the yoke limbs are anchored outwards as a result of loading of the yoke under the wheel load, and creates, on the claws, a pull component which extends parallel to the shoulder surface and under the effect of which the claws might otherwise slip or be moved off the shoulder face.

Further, by employing magnets with the claws the yoke or stirrup can also be effectively used when the relevant shoulder surface of the rim extends slightly obliquely.

By thickening the yoke in the region of its longitudinal center which is positioned on the tread of the tire, a comparatively thin strip material can be used for the rest of the yoke and still provide a sufficient projecting thickness above the tire tread to obtain effective anti-skid protection.

The claws on the anti-skid yoke of the device of the invention can be designed to suitably engage with either the rim shoulders or under the rim flange.

Although the strip material of the yoke may, for example, be comprised of a plastic or rubber material which is sufficiently elastic at low temperatures, it is preferred to make the yoke from a bendable material, preferably a spring-steel strip, which is coated, at least in the longitudinal center of the yoke, with an elastic covering or jacketing. When the yoke is made from bent strip material, in appropriate circumstances the adhesive action of the magnets may be smaller, so that no magnets, or only weak magnets, may be sufficient if the distance of the claws from one another, when the yoke is not fitted is smaller than in the case where the yoke is fitted to the tire. In this case the yoke is opened by resiliently bending its limbs away from each other for fitting to the tire and, therefore, when fitted, acts like a spring clip under the bias of which the claws are pressed axially toward one another and toward the rim.

By covering or jacketing the strip material forming the yoke, the thickened yoke region is formed at the yoke web. Preferably the covering or jacketing also extends as far as the underside of the yoke, so that the ability of the yoke to adhere to the tire profile is improved. In order to achieve good anchorage of the covering or jacketing on the spring steel strip a plurality of holes may be provided in the strip material which will be penetrated by the elastic covering or jacketing.

While the thickened region of the yoke may be formed with a smooth outer surface the gripping capacity is increased if the thickened region of the yoke is equipped with coarse profile, such as by including studs which correspond to the sort of stud profile used on snow tires.

So as to obtain good support of the anti-skid yoke against possible lateral tilting which could occur as a result of propulsive forces acting laterally thereon, the claws on the yoke limbs should be as wide as possible. If the strip material is not wide enough for this purpose, the claws can be designed as T-shaped members so that support arms extend outwardly beyond both side edges of the yoke.

In a further development of the device the anti-skid yoke can be adapted to different tire profiles by having the length of the yoke be variable or adjustable. Suitable adjusting means for adjusting the length of at least one limb of the yoke limbs could be comprised of an adjustable screw device connected to at least one of the yoke limbs. This can, for example, be achieved by dividing the relevant yoke limb into two parts and by riveting or welding a screw to the end of one part with this screw extending through a slotted hole formed in the other part of the yoke limb and then using a wing nut to hold the two parts together and which would allow the length of that limb to be variable. However, it is also possible to provide a screw adjusting device similar in its operation to those used on hose clamps in which the screw axis extends parallel to the strip material, so that by rotating the screw the yoke parts can be drawn together, or pushed apart, in the longitudinal direction of the yoke. When the strip material forming the yoke is made from spring steel strip, in which the yoke limbs in their relaxed conditions have an outwardly arched configuration, it is generally sufficient to adjust the yoke length to adapt it to the associated tire only once, because by manually indenting or deflecting the bent yoke limb inwards the distance of the claw from the center part of the yoke is enlarged, so that when fitting the claw on the wheel, the claw can be easily pushed under the shoulder surface of the rim, against which it is closely applied after the yoke limb has been released.

This permits simple fitting of the anti-skid yoke of the invention, even when the length of the yoke is not adjustable.

For further simplification of the fitting operation, at least one of the yoke limbs may be constructed so as to be resilient in its longitudinal direction, for example it may be made, as a whole, from a resiliently extensible rubber or plastic material. When at least one of the yoke limbs is resilient in its longitudinal direction, in addition to simplifying fitting, one obtains the further advantage that the claws of the yoke are pressed against the associated shoulder surface of the rim when the central region of the yoke is displaced, under wheel loads, radially towards the edge of the rim. Instead of making the entire yoke limb so as to be longitudinally resilient, a spring body, for example a rubber strip or a spiral spring, can be incorporated in the limb.

A suitable material for the covering of jacketing of the anti-skid yoke of the invention is, for example, an abrasion-proof polyamide/polyester/butadiene compound having a cold resistant softener which keeps embrittlement of the material, which occurs at low temperatures, within acceptable limits. A small ceramics magnet of high performance may be used as the magnet for the claws.

In a currently-preferred embodiment of the invention, there is a special arrangement of the magnets in the yoke claws to achieve a particularly strong adhesive effect for the yoke claws on the wheel rim. The claws can, for example, be comprised of two plates made of magnetizable material, which are spaced from one another and between which the magnets are arranged with their poles lying on the plates, on the plate plane extending parallel to the plane of the yoke.

With this design of the claws, a magnet substantially of horseshoe configuration is achieved, where the magnet limbs are formed by the plates of the claws, so that, upon fitting the plates with their inner front edges against the shoulder surfaces of the rim, a considerable strengthening of the magnetic attractive force is achieved as compared with the case where the magnets are placed only with one magnet pole against the shoulder surface of the rim.

In the preferred embodiment of an anti-skid device made according to the present invention, the inner front edges of the plates are formed so as to be complementarily to the contour of the rim shoulder surface on which they are intended to act. This assures the contact surface over which the inner front edges of the plates butt against the rim and on which the magnetic attractive force acts will be as large as possible. Further, the inner edges of the plates could be provided with recesses which approximate the angle-shape configuration of the shoulders of the rim.

The magnetic attractive force between the claws and the wheel rim can be additionally improved if, instead of using a single magnet, several magnets are provided, these being arranged side-by-side between the plates of each claw.

Although also the yoke can be made from an elastically bendable strip material which is thickened in the region of the longitudinal center of the yoke, the yoke web which rests on the tread of the tire may be rigid in design, and made, for example, from an iron material. Preferably the yoke limbs are formed by helical springs which connect on the one hand with the yoke web and on the other hand with the claws. For this purpose, the plates can be connected together via a web or crosspiece in which the helical spring which connects claws to the yoke web is suspended.

Instead of a design made from helical springs, the yoke limbs may be from an elastically bendable strip material or a deformable strip material. In this case, as in the case of the above-described first embodiment, adjusting means for the length adjustment of at least one of the yoke limbs, may be present.

BRIEF DESCRIPTION OF THE DRAWINGS

The preferred embodiments of the present invention will be described further, by way of example, with reference to the accompanying drawings in which.

DETAILED DESCRIPTION OF THE PREFERRED EMBODIMENTS

Figure 2:
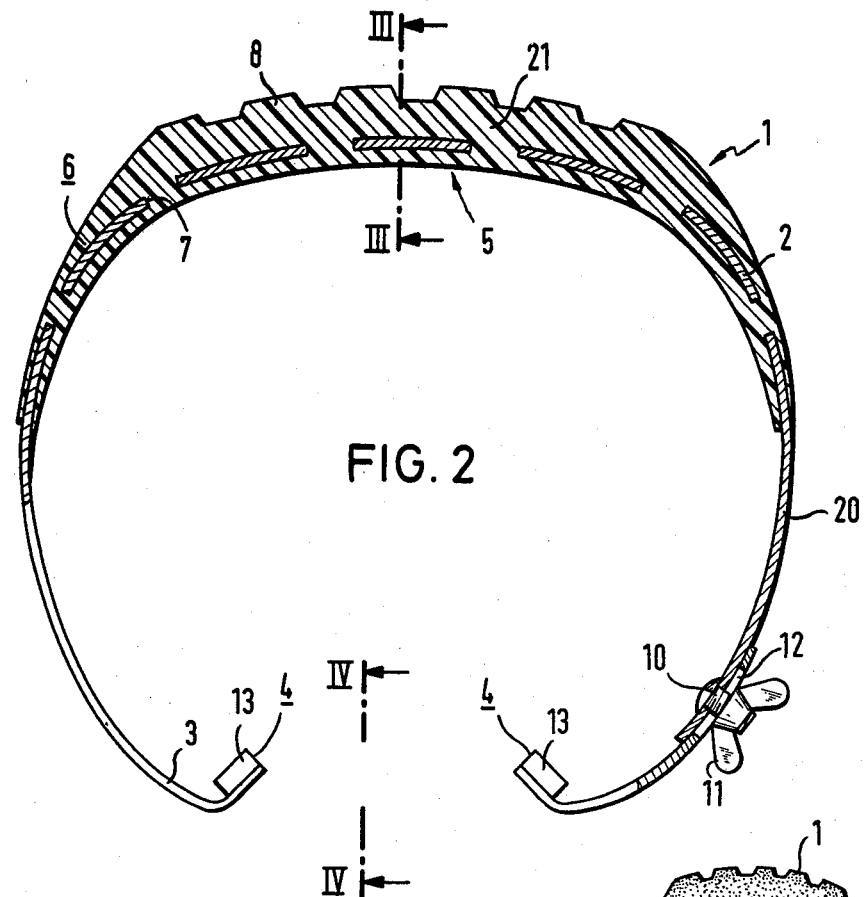
FIG. 2 is an enlarged part-sectional view illustrating a second embodiment of the device of the invention.
Figure 1:
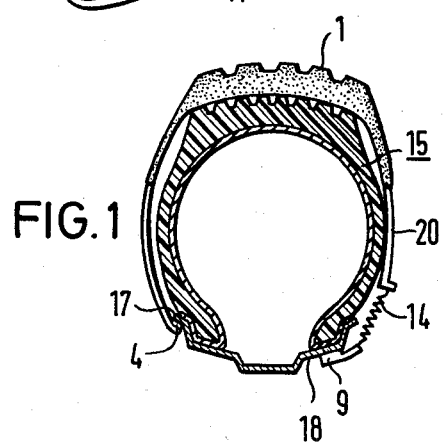
FIG. 1 is a view, partly in section, illustrating an embodiment of the anti-skid device of the invention fitted to the rim of a vehicle wheel.

As can be seen from FIGS. 1 and 2, the anti-skid device of the present invention comprises a yoke or stirrup 1, which has a curved shape so that its inner surface corresponds at least approximately to the cross-sectional contour of a conventional pneumatic tire 15 (see FIG. 1). The yoke or stirrup 1 may be regarded as being in the form of a clip, generally of U-shaped configuration, providing yoke limbs 20 which are convexly curved when viewed from the outside of the device. The yoke or stirrup 1 is formed from a spring steel strip 2 which is faced on both sides, along its central yoke region, generally indicated at 5, which abuts against the tire tread, with a covering 6 of elastic or resilient material. This provides an elastic adhesive layer along the underside of the central yoke region 5 which substantially eliminates the possibility of the yoke slipping on the tire tread. Also, it should be noted that the thickness of covering 6 on the outside of yoke 1 is greater than on the inside and this thickened region 21 is preferably formed with studs 8 along the exterior surface which serve to increase grip. To ensure durable anchorage of covering 6 on spring steel strip 2, the spring steel strip 2 is provided with holes 7, through which the material of the covering 6 extends, so that the outer and inner thicknesses of the covering 6 are integrally connected through the holes 7.

Situated at the free ends of the yoke limbs 20 are claws 4 and 9 which, in adaptation to the wheel rim, are designed to engage under shoulder 18 of the rim, as shown in the right-hand half of FIG. 1, and/or under the rim flange 17, as shown in the left-hand half in FIG. 1. It is also possible to design the claw on the one yoke limb to engage under the rim flange 17 and the claw on the other yoke limb to engage under the rim shoulder 18.

As shown in FIG. 2, each of the claws 4 includes magnet 13 by which it is held in positionally-fixed manner in the fitted position against the relevant shoulder surface of the rim when the latter consists of magnetizable material.

Figure 4:
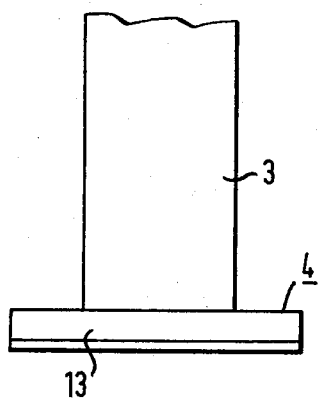
FIG. 4 is a fragmentary view taken as indicated at IV—IV in FIG. 2.
Figure 3:
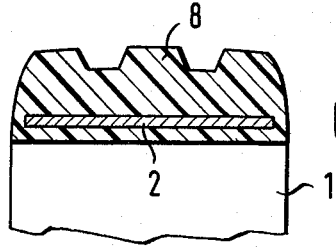
FIG. 3 is a section taken on the line III—III of FIG. 2.

As can be seen from FIG. 4, the claws 4 can be relatively wide and are shaped so as to protrude beyond both side edges of the yoke ends 3.

As can be from FIG. 1, in the right-hand half thereof, a spring 14 can be incorporated into at least one of the yoke limbs 20 (in this case shown as a helical spring) as, for example, between claw 9 and its respective yoke limb 20.

Another possibility for achieving adjustability in length of at least one of the yoke limbs 20 is illustrated in the right-hand half of FIG. 2. In this case, the yoke limb 20 is formed in two parts. Securely riveted or welded at the end of its one yoke limb part is a screw 10 which extends through a slotted hole 12 in the other part of the yoke limb and onto which there is screwed, at the outside of the yoke, a wing nut 11 with which the two yoke parts can be clamped together after adjustment of the desired yoke limb length.

In the case of the yoke of FIG. 2, in the non-mounted condition of the yoke the distance of the claws 4 from one another is preferably shorter than in the fitted condition, so that after fitting, because of the resilience of the spring steel strip 2, the latter is stressed so that the two claws 4 are biased towards one another against the rim and parallel to the axial direction of the wheel so that the yoke acts like a spring clip.

Figure 5:
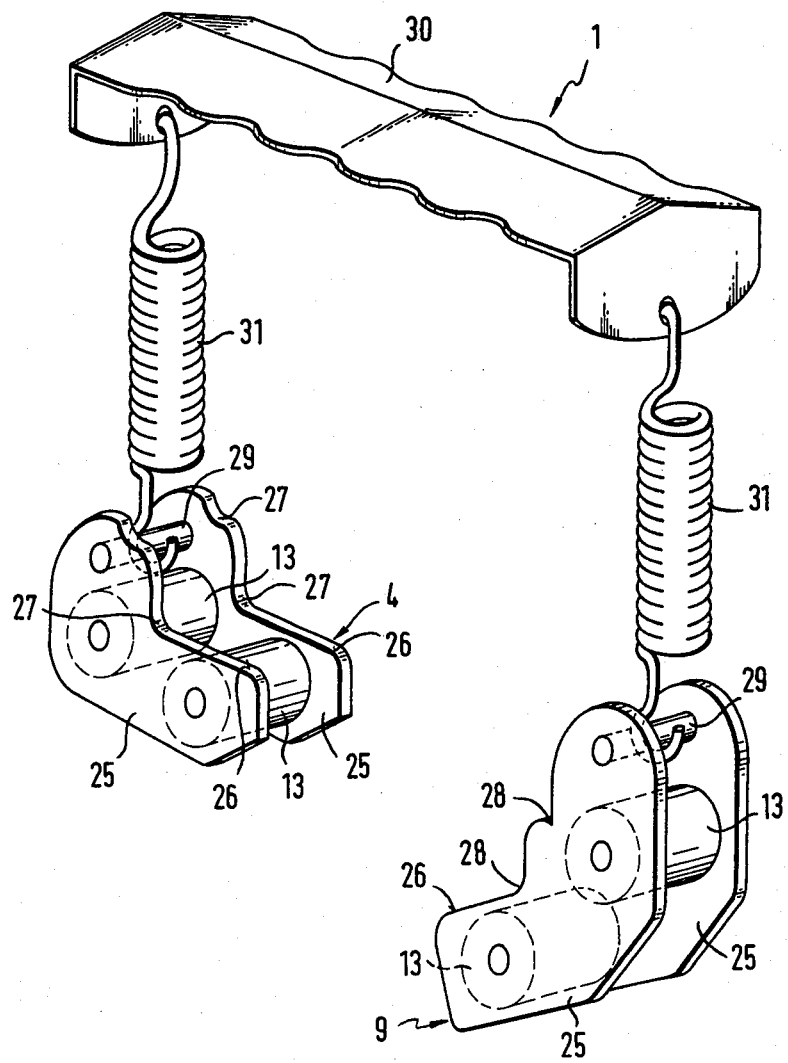
FIG. 5 is a perspective view of a further embodiment of the anti-skid device made according to the present invention.

In another embodiment of the anti-skid device, illustrated in FIG. 5, the yoke web 30 of yoke 1 is made of a stiff sheet material such as a ferrous material. The two ends of yoke web 30 are bent at right angles and each end is provided with a respective hole in which a respective helical spring 31 is suspended. Between its angled ends, yoke web 30 is formed so as to have an angled profile whose profile limbs form an angle of more than 90° with one another and with edges shaped in a serrated manner to help in keeping the yoke in place on the tread of the tire. Under the apex of the angle profile forming yoke web 30 there may be situated, for additional stiffening, a metal rod (not shown). Such a rod could conveniently be made of iron with a thickness equal to or somewhat smaller than the height of the triangle formed by the insides of the profile limbs of the angle profile and the plane connecting the free edges thereof.

The other end of each helical spring 31 is engaged with a cross piece 29 in left and right claws 4 and 9, respectively. The claws 4 and 9 are each comprised of two plates 25 of magnetizable material with permanent magnets 13 arranged therebetween. Each permanent magnet 13 lies with its positive pole in metallic contact with one of the plates 25 while its negative pole is in contact with the other plate 25. The inner edges 26 of plates 25 are adapted to the contour of the wheel rim by being formed in such a way that claws 4 and 9 can be placed with these edges 26 against the rim and then engage under a shoulder of the rim.

As can be seen from FIG. 5 claw 4 has a different configuration from claw 9. Claw 4 is intended to be fitted against the inside of the wheel rim and for this purpose has, at the inner edges 26 of the plates 25, recesses 27 into which the shoulder surfaces come to rest under the rim or the rim flange on the inside of the rim. The inner edges 26 of the plates 25 of the other claw 9 are also contoured and form recesses 28 which engage the underside of the rim flange or the rim shoulder at the outside of the rim.

Each of the permanent magnets 13 is cylindrical and is provided with a center bore through which a pin extends which is connected to plates 25. The web 29, similarly connecting plates 25 together are similarly designed as round pins.

Instead of being formed from two plates 25, each claw 4 or 9 may be formed from more than two plates spaced apart from one another and between which respective permanent magnets 13, with correspondingly arranged poles, are disposed so as to form magnetic field circuits which are closed via the plates and the rim material. In this example, the rim material acts like the core of a transformer. The plates may be of steel sheet or material suitable for use as transformer sheets or plates.

Obviously it is possible to make modifications of the embodiments shown in the drawings. For example, it would be possible to construct one or both of the claws of each yoke like the claws 4 of FIGS. 1 and 4 using, however, as a claw a relatively long bar of magnetic material which extends as a circle segment which is curved so as to approximately correspond to the peripheral curvature of the rim flange 17. Such a relatively long, curved claw is particularly suitable for the axially inner side of the wheel rim if there is relatively less free space because of the presence, for example, of a large brake disc of a disc brake. In a given case, such a curved claw could also circumscribe a relatively great peripheral angle which can, in a given case, amount up to 120 degrees.

Further, it is also possible to construct one of the claws as the curved claw described in the preceding paragraph whereas the other claw, which is associated with the axially outer side of the wheel rim, is constructed like claw 9 in FIG. 5, because this outer side of the wheel rim is more easily accessible and a greater free space is present there for the claw.

While the invention has been described in connection with what is presently conceived to be the most practical and preferred embodiment, it is to be understood that the invention is not to be limited to the disclosed embodiment but on the contrary, is intended to cover various modifications and equivalent arrangements included within the spirit and scope of the appended claims, which scope is to be accorded the broadest interpretation of such claims so as to encompass all such equivalent structures.

What is claimed is:

1. An anti-skid device for mounting on a wheel comprised of a wheel rim and a tire, said device comprising:
   a yoke having a central section for engaging the tread face of said tire;
   a pair of limb means, one each extending outwardly from each of the opposite ends of said central section, each of said limb means being arcuately bendable and having a free end; and
   magnetic attachment means secured to each of said free ends for engaging the shoulder of said wheel rim so that when said device is mounted on said wheel, said limb means yield to forces acting in the radially inward direction upon said central section of said yoke in order to not transmit said force to said magnetic attachment means, at least one of said attachment means including a magnetic claw means having a portion which extends beyond the width of said limb means so that when a force acts upon said central section in a substantially circumferential direction, the width of said at least one magnetic claw means acts against said wheel rim to prevent tilting of said yoke to preserve the placement of said device upon said wheel.

2. A device as claimed in claim 1 wherein said yoke is made from an elastically bendable strip material thickened in said central section.

3. A device as claimed in claim 1 wherein said yoke is made from spring-elastic strip material bent to approximately horseshoe-shape and covered, at least in said central section, with an elastic covering.

4. A device as claimed in claim 3 wherein said strip material at said central section is provided with holes which are penetrated by said elastic covering.

5. A device as claimed in claim 2, 3, or 4 wherein the exterior surface of said center section of said yoke is provided with studs.

6. A device as in claim 1 wherein both of said magnetic claw means include elongated portions which project beyond the sides of said free ends.

7. A device as in claim 1 wherein said yoke further includes means for varying the length of at least one of said limb means.

8. A device as in claim 1 wherein at least one of said limb means is resilient in its longitudinal direction.

9. A device as in claim 8 wherein said resilient limb means includes a spring body therein.

10. A device as in claim 1 wherein said limb means are arched out, in an arcuate manner, towards their outsides.

11. A device as in claim 1 wherein said central section is comprised of a spring-steel strip.

12. An anti-skid device for mounting on a wheel comprised of a wheel rim and a tire, said device comprising:
    a yoke having a central section for engaging the tread face of said tire;
    a pair of limb means, one each extending outwardly from each of the opposite ends of said central section, each of said limb means being arcuately bendable and having a free end; and
    magnetic attachment means secured to each of said free ends for engaging the shoulder of said wheel rim, so that when said device is mounted on said wheel, said limb means yield to forces acting in the radially inward direction upon said central section of said yoke in order to not transmit said force to said magnetic attachment means, at least one of said attachment means comprises a claw element having two, spaced apart plates of a magnetizable material with at least one elongated magnet disposed therebetween so that its poles lie on opposite plates, said plates extending parallel to the plane of the yoke, so that when a force acts upon said central section in a substantially circumferential direction, the width of said at least one claw element securely grips said wheel rim at spaced apart locations to preserve the placement of said device upon said wheel.

13. A device as in claim 12 wherein the inner edges of said plates are formed with recesses which approximate the shaped configuration of the shoulders of the rim.

14. A device as claimed in claim 12 wherein a plurality of individual magnets are provided between said spaced apart plates.

15. A device as in claim 12 wherein said limb means comprises helical springs.

* * * * *